(No Model.)

G. PINKERT.
TRICYCLE.

No. 463,283. Patented Nov. 17, 1891.

Witnesses:
Theodor Steudel
Wilhelm Kirst

Inventor:
Georg Pinkert
per Gerson Jachne
Attorneys.

THE NORRIS PETERS CO., PHOTO-LITHO., WASHINGTON, D. C.

UNITED STATES PATENT OFFICE.

GEORG PINKERT, OF MUNICH, GERMANY.

TRICYCLE.

SPECIFICATION forming part of Letters Patent No. 463,283, dated November 17, 1891.

Application filed November 23, 1889. Renewed September 17, 1891. Serial No. 405,959. (No model.)

*To all whom it may concern:*

Be it known that I, GEORG PINKERT, merchant, a subject of the Emperor of Germany, residing at Munich, in the Empire of Germany, have invented certain new and useful Improvements in Tricycles for Use on Land and Water; and I do hereby declare that the following is a full, clear, and exact description of the same.

My invention relates to improvements in tricycles serving for locomotion on the water as well as on land; and the object of my improvements is to render the tricycle light and commodious for use on land, while when on the water the joint weight of rider and vehicle causes the latter to be only so far immersed as to admit of unimpeded locomotive operation. I attain this object by the construction of the wheels of the tricycle illustrated in the accompanying drawings, in which—

Figure 1:
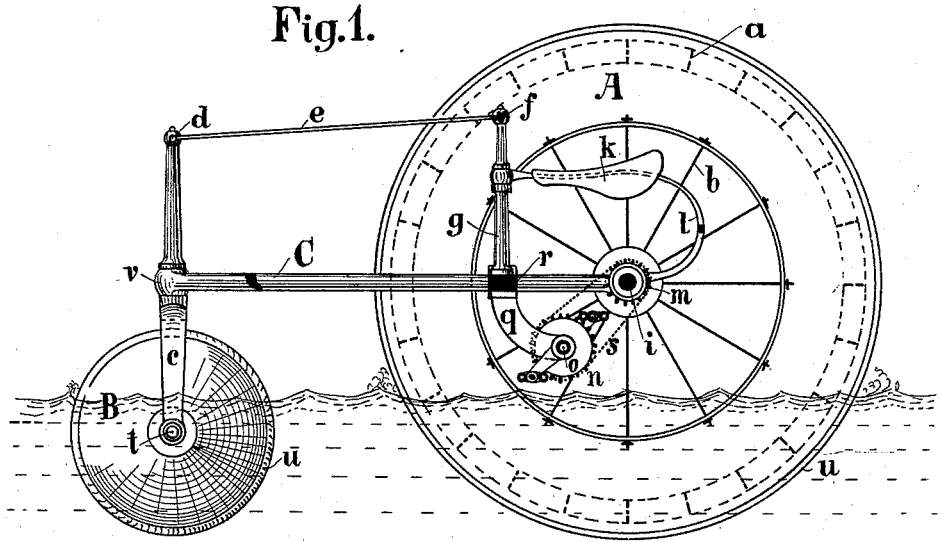
Figure 2:
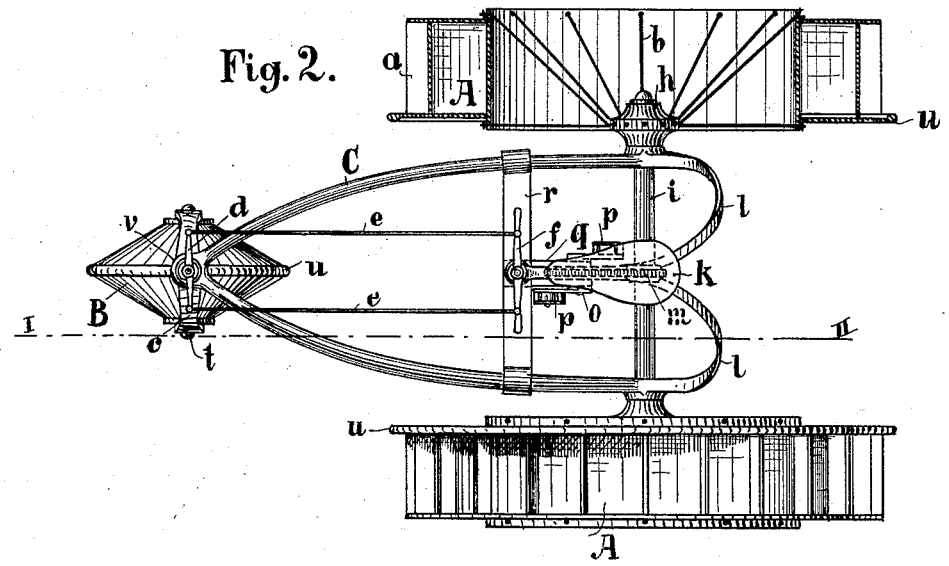

Figure 1 is a vertical section of the tricyle on the line I II, Fig. 2; and Fig. 2, a top view of the tricycle, one driving-wheel being shown in horizontal section.

The two driving-wheels A consist of hermetically-closed hollow rings, preferably made of sheet metal and provided on their circumference with paddles $a$. Each of these rings is secured by means of spokes $b$ to a nave $h$, wedged on the driving-axle $i$. The latter is revolubly lodged in a frame C, provided in front with an eye $v$, in which is horizontally revoluble the vertical central pivot of a fork $c$, to which the guide-wheel B is attached. The guide-wheel B consists of a hollow hermetically-closed lenticular body, the axle $t$ of which is revolubly lodged in the two extremities of the fork $c$.

Each of the three wheels A A B has attached to its circumference a suitably projecting annular flange or tire $u$, serving for use of the vehicle on land.

In Fig. 1 is shown the tricycle used on water. In this case the paddles $a$ serve for propelling the vehicle. Any known or suitable devices may be employed for operating the guide-wheel B, say, for turning the fork $c$ and for revolving the driving-wheels A A. The device shown in the drawings, therefore, is only given as an example and forms no part of this present invention. The seat or saddle $k$ is placed on the two branches or arms $l$ of the frame C, which is, moreover, provided with a cross-piece $r$, carrying in its center an upwardly-extending arm $g$ and below two symmetric arms $q$. In the extremities of these two arms $q$ is lodged the shaft $o$, to which the pedal-cranks $p$ and the chain-wheel $n$ are attached. From the chain-wheel $n$ an endless chain $s$ passes over another chain-wheel $m$, keyed on the axle $i$ of the driving-wheels A A. The upper arm $g$ of the cross-piece $r$ carries at the top a horizontally-revoluble two-armed horizontal lever $f$ for guiding and steering the vehicle. The extremities of said lever $f$ are respectively connected by drawing-rods $e\ e$ with the extremities of a similar two-armed lever $d$, rigidly secured to the top of the upper central pivot of the fork $c$, which holds the guide-wheel B, thereby allowing the latter to be directed in the well-known way by the rider.

Having thus described my invention, what I claim, and desire to secure by Letters Patent, is—

In a tricycle for use on land and water, the combination of the driving-wheels A, consisting of hollow rings provided on their circumference with paddles $a$ and an annular flange $u$, and being secured by means of spokes $b$ to the nave $h$, wedged on the driving-axle $i$, with the frame C, in the eye $v$ of which is horizontally revoluble the fork $c$, holding the hollow lenticular guide-wheel B, the seat or saddle $k$, placed on the two branches $l$ of the frame C, the upper arm $g$ of the cross-piece $r$, carrying the horizontal two-armed lever $f$, the drawing-rods $e$, and the two-armed lever $d$, secured to the top of the fork $c$, as described, and for the purpose specified.

GEORG PINKERT.

In presence of—
 EDW. W. MEALEY,
 EMIL HENZEL.